Dec. 23, 1930.                C. H. WALLACE                1,785,796
                    SIGNAL WINDOW FOR AUTOMOBILE DOORS
                  Filed June 10, 1929          2 Sheets-Sheet 1
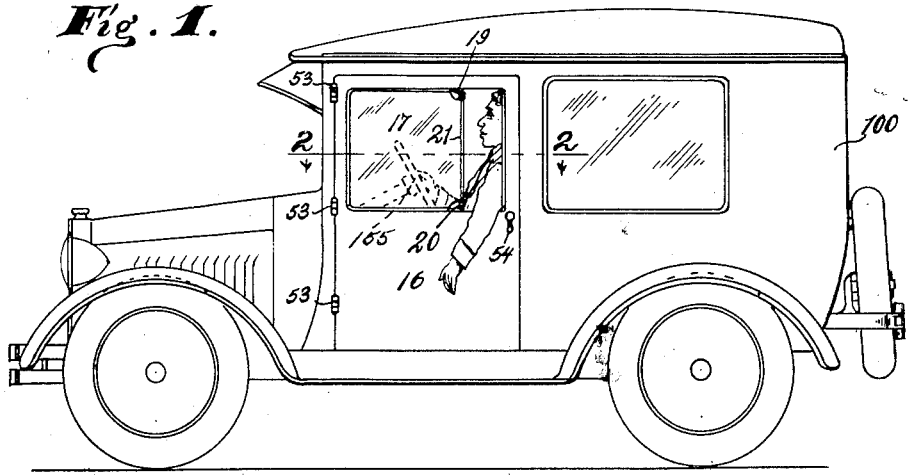
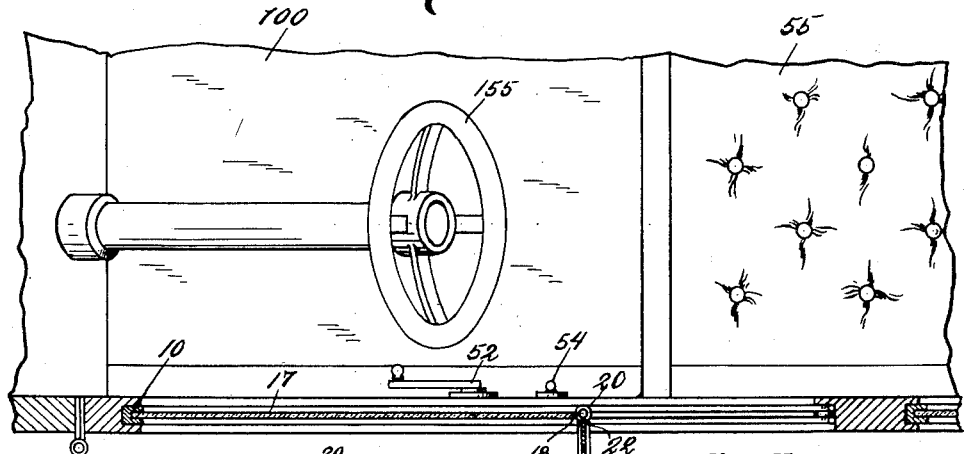
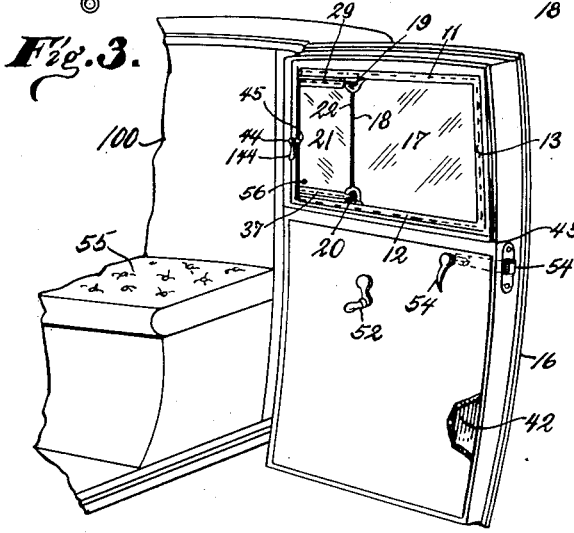
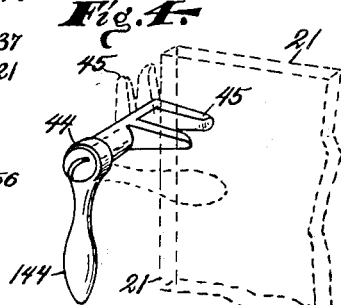
Inventor
Cyrus Henry Wallace.
by
Lockwood & Lockwood,
His Attorneys.

Dec. 23, 1930.   C. H. WALLACE   1,785,796
SIGNAL WINDOW FOR AUTOMOBILE DOORS
Filed June 10, 1929   2 Sheets-Sheet 2
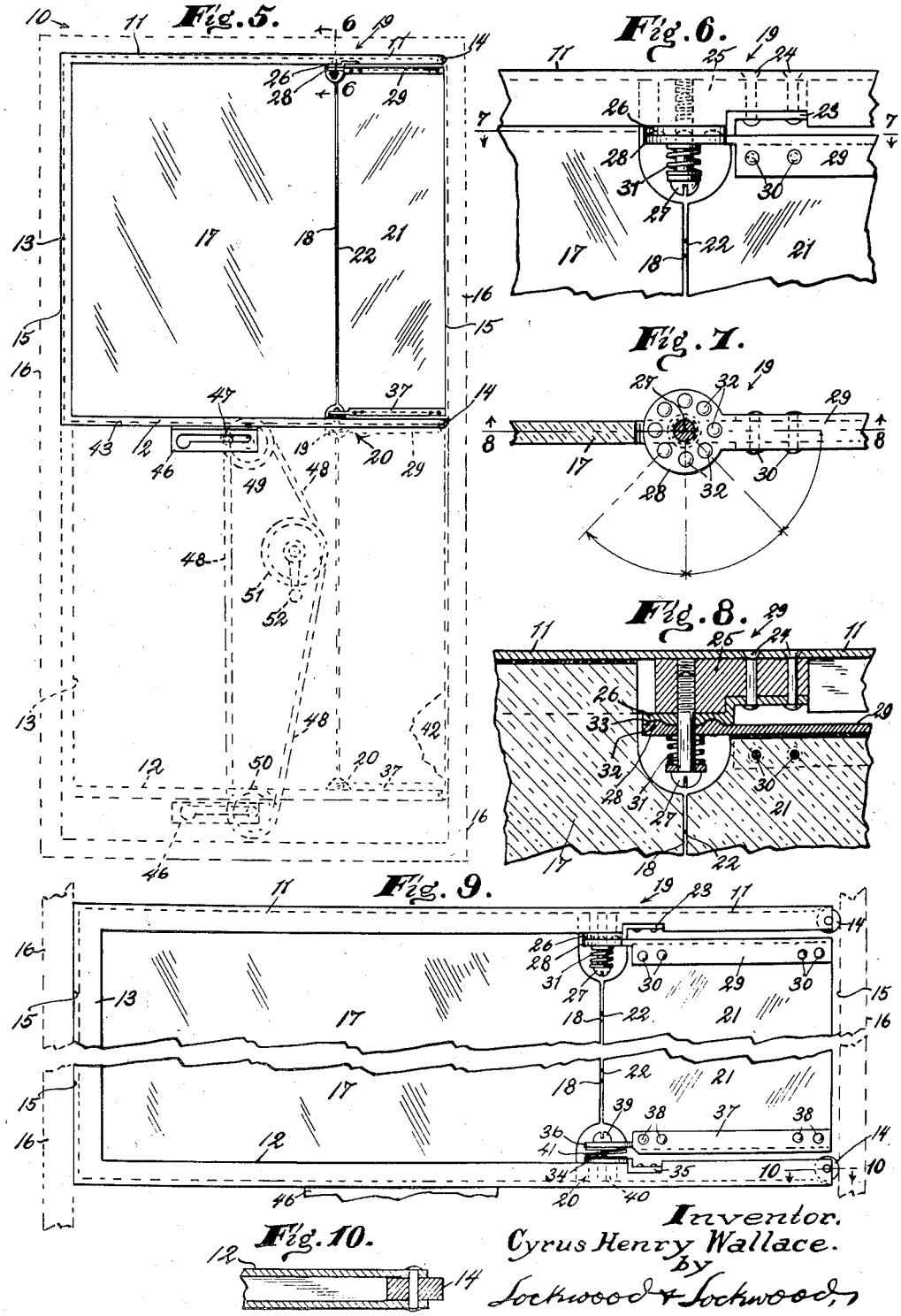
Inventor.
Cyrus Henry Wallace.
by Lockwood & Lockwood,
His Attorneys.

Patented Dec. 23, 1930

1,785,796

UNITED STATES PATENT OFFICE

CYRUS HENRY WALLACE, OF SAN GABRIEL, CALIFORNIA

SIGNAL WINDOW FOR AUTOMOBILE DOORS

Application filed June 10, 1929. Serial No. 369,889.

This invention relates to an improvement in a window construction for automobile doors, and the principal object thereof is to provide a window having a relatively narrow transparent panel arranged vertically in the window frame and adjacent the driver's seat that is normally held in closed position, but which can be easily and quickly opened when the driver desires to extend his hand to signal.
To that end I provide a window that is either raised or lowered in the door frame to a closed or opened position in the usual way with a transparent panel therein which, when the window is in closed position, can be easily and quickly opened so that the driver can extend his hand outward and upward to signal a right hand turn, straight out to signal a left hand turn or downwardly to signal a stop or to make the usual signals given in automobile driving.

Another object of the invention is to provide a transparent panel for an automobile window which when opened for signalling also functions as a windshield to protect the driver from the wind and rain in inclement weather, which panel can also be used for the purpose of ventilation when necessary.

Features of invention are shown in the construction, combination and arrangement of parts whereby an improved window for automobile doors is provided that is easy to construct, assemble and operate, that is neat and pleasing in appearance and effective and durable in use.

A feature of invention is shown in the means for pivotally mounting the transparent panel so that when moved from stop to stop it will remain either open or closed in a relatively fixed position until again manually moved from one position to another. In other words I provide upper and lower hinges that support the panel with the upper hinge provided with a number of stops adapted to hold the panel fully closed or open, or in positions intermediate of the fully opened or closed positions.

Other objects, advantages and features of invention may appear from the accompanying drawings, the subjoined detailed description and the appended claims.

The accompanying drawings illustrate the invention in which:

Figure 1 is a semidiagrammatic view of an automobile having a window constructed in accordance with this invention showing the transparent panel in open position and the driver's hand extended downward to indicate the stop signal.

Fig. 2 is an enlarged fragmental semidiagrammatic section on line 2—2, Fig. 1, showing the panel in open position.

Fig. 3 is a fragmental perspective view of the inside of an automobile door with the improved window and panel in closed position showing the panel adjacent the automobile driver's seat.

Fig. 4 is a perspective view of a gravity actuated guide latch for aiding the detent stops in holding the transparent panel in closed position, also showing by dotted lines the position of the latch when arranged to disengage the edge of the panel.

Fig. 5 is an enlarged semidiagrammatic view of the window and its associated panel in closed position, and showing by dotted lines the door frame, means for raising and lowering the window and also showing the window and panel in lowered position.

Fig. 6 is a fragmental side view of the upper hinge for connecting the transparent panel to the window frame.

Fig. 7 is a fragmental section on line 7—7, Fig. 6, showing a plan view of one of the hinge disks that carries the detents for engaging recesses in the upper disk to hold the panel in various detachable positions.

Fig. 8 is a fragmental section on the line 8—8, Fig. 7, showing additional detail of the upper hinge.

Fig. 9 is a fragmental side view of the improved window and its associated transparent panel showing both the upper and lower hinges for connecting the panel to the window frame, and also showing roller guides for the window frame, part of the door frame shown by dotted lines.

Fig. 10 is a fragmental section on the line 10—10, Fig. 9, showing one of the roller guides.

The improved window includes a three piece frame 10 having upper and lower channel irons 11 and 12 arranged horizontally that have an end of each integral with a vertically arranged side channel bar 13, and the free ends of the irons 11 and 12 are provided with guide rollers 14 so that the window frame can be easily moved in a guideway 15 in the door frame 16.

A main transparent pane 17 is arranged in the window frame 10 with three of its edges secured in the channels of the irons 11 and 12 and the bar 13, and fills a major portion of the frame, and adjacent the free edge 18 of the pane 17 are upper and lower hinges 19 and 20 that are secured to the respective irons 11 and 12; and these hinges carry an elongated narrow, transparent panel 21 that fills a minor portion of the frame and normally is supported in the window frame in the same plane as the pane 17 and an edge 22 of this panel is arranged adjacent the edge 18 of the pane 17 with sufficient clearance between them to permit the panel to be turned in an arc.

The clearance between the edges 18 and 22 is not sufficient to permit an excessive inrush of air or rain into the automobile 100.

The hinge 19 includes a plate 23 that is secured by rivets 24 to a block 25 in the channel of the iron 11 and this plate has a bearing portion 26 in the form of a disk with a center opening therethrough for the bearing pin 27 adjustable in the block 25.

The other member of the hinge includes a disk 28 integral with a channel iron 29 that is secured by rivets 30 to the top edge of the panel 21, and interposed between the head of the pin 27 and the disk 28 is a spring 31 that is under sufficient tension to cause the detents 32 on the disk 28 to enter the corresponding recess 33 in the disk 26 and thereby detachably hold the panel 21 in predetermined positions in its arc movement.

The detents 32 and corresponding recesses 33 are arranged in the disks so that the panel 21 can be turned in an arc from a closed to an open position and vice versa; and in so moving the panel the detents act as stops to hold it in predetermined positions shown by curved arrows and radial lines in Fig. 7.

There can be as many of the detents and recesses as may be desired. For the purpose of illustration I show the disk 28 provided with eight detents 32 spaced an equal distance apart and an equal radial distance from the center of the disk, and preferably there are the same number of recesses 33 in the disk 26 that are arranged in the same order as there are detents in the disk 28. It is understood, however, that I can employ one or more of the detents 32 and a large number of the recesses 33 if I so desire.

The hinge 20 differs slightly in construction from the hinge 19. It has a member 3 secured by rivets 35 to the channel iron 12 and the other member 36 is integral with the channel iron 37 that is secured to the bottom of the panel 21 by rivets 38. These members are pivotally connected together by a pin 39 extending into a block 40 secured to the channel iron 12, and interposed between the hinge members 34, 36 is a light spring 41 that is adapted to compensate for the up and down movement of the panel 21 when the detents 32 are moved into and out of the recesses 33 by the arc movement of the panel. In other words when the panel 21 is moved either toward an open or closed position the detents move into and out of the recesses and thereby cause a slight endwise movement of the panel.

As previously indicated the window frame 10 is slidably mounted in the door frame 16 so it can be moved from the recess 42 in the bottom closed portion of the door to close the rectangular opening 43 through the top of the door, and vice versa, and when the window frame 10 is so moved the panel 21 is held in the same plane as the pane 17 by means of the detents and recesses in the hinge 19.

If desired, however, the door frame 16 can be provided with a gravity guide latch 44 having a guide 45 that is adapted to extend over an edge portion of the panel when in closed position and this guide latch can be manually moved to disengage the edge of the panel as indicated by dotted lines in Fig. 4 when the panel is to be moved in an arc to form an opening through which the automobile driver can signal. It is understood that the guide latch can be constructed and operated in various ways and is shown in the drawings only for the purpose of illustration.

The window frame 10 is moved toward and from opened and closed position in the usual way. That is a slotted plate 46 is secured in position to receive the roller 47 secured to a chain 48 that extends over the sprocket wheels 49, 50 and 51 so that when the crank 52 is actuated in either direction the window frame 10 will be reciprocated in the guideway 15, see Fig. 5. This mechanism is old and well understood in the art and forms no part of this invention and for that reason is not shown or described in detail.

The door 16 is provided with the usual hinges 53 and door latch 54, as best indicated in Figs. 1, 2 and 3, and these parts are old in the art and can be constructed and arranged in any desired way.

The improved window 10 is preferably constructed and arranged so that the panel 21 is conveniently located relative to the driver's seat 55 and steering wheel 155 so that the driver can use his left hand to move the panel to open position for signalling and also to afterwards close the panel.

The panel is preferably narrow, elongated and arranged vertically in the window so that when opened it provides an elongated opening through which the driver can extend his hand upward, outward or downward to make the usual driving signals, as previously stated.

In operation with the window up in closed position the panel 21 will be aligned with the panel 17 to practically close the rectangular opening 43 through the door and will remain in that position until the driver desires to signal at which time he will push on the panel to move it to an open position so he can extend his hand upwardly through the vertical elongated opening to signal his intentions to make a right hand turn, straight out to indicate a left hand turn or downwardly to indicate his intentions to slow down or stop.

When so moved the detents 32 will be moved into and out of the recesses 33 to hold the panel in open position until it is intentionally closed by the driver.

The panel 21 can be provided with button 56, as indicated in Figs. 2 and 3, by which it can be drawn by the driver from open to closed position. When the guide latch 44 is used to aid the detents 32 in holding the panel 21 in a closed position or in alignment with the pane 17 it is first moved to disengage the guide 45 from the edge of the panel before the latter is moved in an arc to an open position, and also the guide is manually moved out of the way of the panel when it is returned to a closed position. Normally the handle 144 is automatically actuated by gravity to hold the guide 45 astride the edge of the panel when in closed position.

When the panel is opened for signalling it also forms a windshield to protect the automobile driver from the wind and rain, and if desired it can be opened in some instances for the purpose of ventilation as previously stated.

I claim as my invention:

1. An improvement in a window including a frame having upper and lower channel irons connected by a vertically arranged channel bar so that one side of the frame is open, a main transparent pane secured in the channels of said irons and bar arranged to leave an elongated narrow space at the open side of said frame, hinges secured to said upper and lower channel irons, an elongated transparent panel secured to said hinges within the frame and arranged vertically so as to normally fill the narrow space in said frame and so it can be moved in an arc, and stops connected with said hinges for holding said panel in a number of prearranged positions in said arc for the purpose specified.

2. An improvement in a window for an automobile door including a window frame, upper and lower channel irons to said frame, a vertically arranged channel bar integral with an end of each of said irons, a transparent pane secured in said frame so it extends into the channels of said irons and bar, hinges secured to said upper and lower channel irons, a transparent panel secured to said hinges adapted to be moved in an arc, and spring pressed stops connected to said hinges for holding said panel in prearranged positions in said arc for the purpose specified.

3. An improvement in a window for an automobile door including a window frame, upper and lower channel irons to said frame, a vertically arranged channel bar integral with an end of each of said irons, a transparent pane secured in said frame so it extends into the channels of said irons and bar, hinges secured to said upper and lower channel irons, a transparent panel secured to said hinges that is adapted to be moved in an arc, spring pressed stops connected to said hinges for holding said panel in prearranged positions in said arc, and roller guides pivotally connected to the free ends of said upper and lower channel irons for the purpose specified.

4. In an improvement in a window for an automobile door the combination with a door frame having a recess therein and a rectangular opening therethrough, a window frame slidably mounted in said door frame so it is movable from said recess into said rectangular opening, a main transparent pane secured in said window frame so as to leave an elongated narrow vertical space to one side of said frame, and an elongated transparent panel arranged vertically in the narrow space within said window frame that is movable from a closed to an open position so that the hand of the automobile driver can be extended outwardly and upwardly through the narrow vertical opening to signal his intentions to make a right hand turn, straight out to indicate a left hand turn or downwardly to signal his intentions to slow down or stop.

5. In an improvement in a window for an automobile door the combination with a door frame having a recess therein and a rectangular opening therethrough of a window frame slidably mounted in said door frame so it is movable from said recess into said rectangular opening, a main transparent pane secured in said window frame, a narrow elongated panel arranged vertically in said window frame and edge to edge with said pane, means for pivotally connecting said panel to said frame so it can be moved in an arc to form an elongated opening through said window frame through which the hand of the automobile driver can be extended for signalling, stops on said pivotal connection for detachably holding said panel in predetermined positions in said arc, and a gravity actuated latch for normally holding said narrow panel in a closed position.

In witness whereof, I have hereunto affixed my signature.

CYRUS HENRY WALLACE.